United States Patent [19]

Tanioka et al.

[11] 4,363,265
[45] Dec. 14, 1982

[54] ADJUSTABLE PULP OUTLET FOR JUICE EXTRACTOR

[75] Inventors: Susumu Tanioka, Yokohama; Akiyoshi Sasaki, Tokyo; Shozi Hoshino, Sagamihara, all of Japan

[73] Assignee: Tokyo Electric Co., Ltd., Tokyo, Japan

[21] Appl. No.: 268,004

[22] Filed: May 28, 1981

[30] Foreign Application Priority Data

May 31, 1980 [JP] Japan .............................. 55-75282[U]
May 31, 1980 [JP] Japan .............................. 55-75283[U]

[51] Int. Cl.³ .............................................. A23N 1/02
[52] U.S. Cl. ........................................ 99/510; 99/513; 100/117; 100/148
[58] Field of Search .................. 99/495, 348, 509–513, 99/483, 516; 100/117, 145, 147–149; 366/81, 88–90, 318, 319, 323, 324; 210/173, 174, 405, 450; 241/260.1; 425/207, 208, 198; 137/852; 277/71, 79

[56] References Cited

U.S. PATENT DOCUMENTS 797,394 8/1905 Roberts .............................. 100/148
2,109,398 2/1938 McNitt ........................... 100/148 X
2,315,028 3/1943 Thomas ........................... 100/121 X Primary Examiner—Philip R. Coe
Assistant Examiner—Timothy F. Simone
Attorney, Agent, or Firm—James E. Nilles

[57] ABSTRACT

Apparatus for separating the juice and pulp or residual matter of fruit or vegetable material comprises a case having a substantially conical bore. The case has a material inlet opening on the top which communicates with the wide end of the bore; a juice outlet opening (with a filter therein) on the bottom which communicates with the bore; and a residual matter outlet opening on one side which communicates with the narrow end of the bore. A motor-driven rotary member is rotatably mounted in the bore. The rotary member has a spiral cutting blade portion for cutting the material into pieces and a spiral pressing portion connected to the spiral cutting blade portion for pressing and squeezing the cut pieces to extract the juice therefrom. The rotary member cuts material entering through the inlet opening into pieces, and feeds the pieces toward the narrow end of the bore while squeezing the pieces to separate the juice and the pulp or residual matter. An automatically adjustable open and close member is arranged on the outside of the residual matter outlet opening. This member is urged by a spring to one position wherein it closes the residual matter outlet opening, and is urged by the pressure of the residual matter or pulp being discharged from the residual matter outlet opening to another position wherein it opens the residual matter outlet opening. This member ensures that the material in the bore meets sufficient resistance so that efficient juice extraction occurs.

7 Claims, 7 Drawing Figures

ADJUSTABLE PULP OUTLET FOR JUICE EXTRACTOR

BACKGROUND OF THE INVENTION

1. Field of the Invention

The present invention relates to food processing apparatus and, more particularly, to juicer apparatus having a hollow case in which a rotary member cuts, feeds and squeezes material, such as fruits or vegetables to extract juice and residual matter or pulp from the material. In particular it relates to an adjustably movable member for controlling the size of the pulp outlet of the hollow case.

2. Description of the Prior Art

Conventional centrifugal separating type juice extracting apparatus poses several problems. For example, high speed rotation of that the large cutting blade causes noise to be generated. Further, the apparatus becomes large in size due to the centrifugal separating cage. Also, the vitamins in juice are destroyed by the action of the appartus. Finally, washing of the parts of the apparatus after use is difficult.

It is proposed to provide improved apparatus wherein the material to be processed is inserted into a bore in a case through a material inlet opening and is cut, fed and pressed by a rotary member in the bore to extract juice from material, such as fruits or vegetables, and to cause the residual matter to be discharged from a residual matter outlet opening in the case. The rotary member comprises a spiral cutting blade portion and a pressing portion which extends from the cutting blade portion, which portions cooperate with the peripheral wall of the bore in the case. However, it so happens that, if the residual matter outlet opening is relatively large, the feeding resistance of the material to be processed is relatively small at the pressing portion of the rotary member and the material may be discharged without being squeezed fully and the squeezing efficiency becomes low. If the material includes a large quantity of pulp, such as tomato or water melon, the pulp which has not yet been separated fully from the juice may be discharged. On the other hand, if the residual matter outlet opening is relatively small, it is difficult to wash out the residual matter remaining in the case, the feeding resistance of the material to be processed at the pressing portion of the rotary member becomes large, and the internal pressure in the case increases rapidly, so that the case may be damaged or a large stress applied on some portion of the rotary member.

SUMMARY OF THE INVENTION

The present invention has been accomplished in view of the problems explained heretofore. According to the present invention, the opening area of the residual matter outlet opening provided at one side of a forward end portion of the squeezing case is adjusted by an adjusting open and close member which is arranged so as to face to the opening and urged in a closing direction of the residual matter outlet opening by a resilient member. In the apparatus of the invention, if material including a large quantity of pulp is to be processed, the area of the residual matter outlet opening is reduced, the discharge of the residual matter is suppressed, the remaining time of the material in the pressing portion is extended, and the pressing force is increased, so that a fine pulp with juice can be extracted from the material through the filter and so that the residual matter can be discharged from the residual matter outlet opening by moving the adjusting open and close member in response to the pressing force of the residual matter discharged against the pressure of the resilient member.

Further, in an another embodiment of the apparatus of the present invention, a residual matter reservoir, the opening of which is larger than the residual matter outlet opening, is provided in the residual matter discharge sleeve which projects from the outer surface of the squeezing case at the residual matter outlet opening, and an opening and closing member having a closing portion for reducing the opening area of the residual matter outlet opening is detachably inserted into the residual matter discharge sleeve, so that washing can be carried out easily by using a large residual matter outlet opening, so that the squeezing efficiency can be enhanced, and so that the internal pressure in the case can be prevented from being increased rapidly.

Furthermore, in the other embodiment of the apparatus of the present invention, a residual matter reservoir, the opening of which is larger than the residual matter outlet opening, is provided in the residual matter discharge sleeve which projects from the outer surface of the squeezing case at the residual matter outlet opening, an opening and closing member having a closing portion for reducing the opening area of the residual matter outlet opening is detachably inserted into the residual matter discharge sleeve, and a spring portion is connected as one body to said open and closing member, so that washing can be carried out easily by using a large residual matter outlet opening, so that the squeezing efficiency can be enhanced, so that the number of parts of the apparatus can be minimized to simplify the assembly, and so that the residual matter outlet opening can be controlled according to the quantity of the residual matter discharged from the residual matter outlet opening.

In the cooking apparatus of the present invention, the open and close member can easily be removed from the residual matter discharge sleeve, if the length of the guide edge formed at the residual matter discharge sleeve is so determined that a clearance space allowing the open and close member to be inserted into and removed from the residual matter discharge sleeve is left in the residual matter discharge sleeve.

Further, in the cooking apparatus of the present invention, the open and close member can easily be inserted into and removed from the residual matter discharge sleeve, by using such a construction that a spring portion is connected to the closing portion of the open and closing member through a hinge and an operating portion with latching portions is formed on said spring portion.

These and other objects and features of the present invention will become more apparent from the following detailed description to be read in conjunction with the accompanying drawings.

DETAILED DESCRIPTION OF THE PREFERRED EMBODIMENTS

Hereinafter, a preferred embodiment of the invention will be described with reference to the accompanying drawings.

Figure 1:
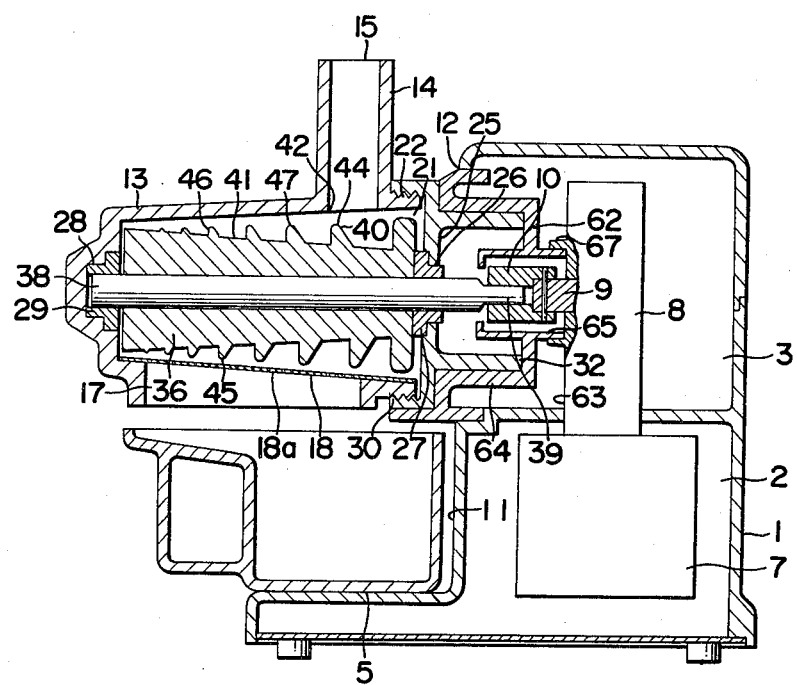
FIG. 1 is a longitudinal sectional side view of food processing apparatus, such as a juice extractor, constructed in accordance with one embodiment of the invention.
Figure 2:
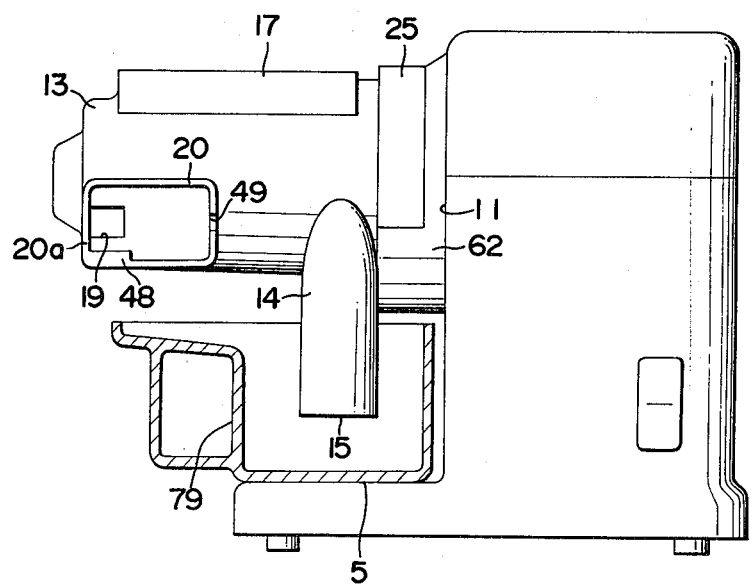
FIG. 2 is a side view of the apparatus of the invention in an inoperative state.
Figure 3:
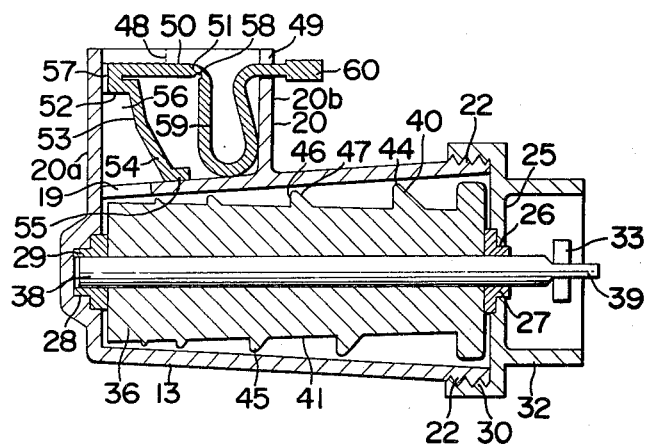
FIG. 3 is an enlarged cross sectional view of the case and the rotary member therein of the apparatus.
Figure 4:
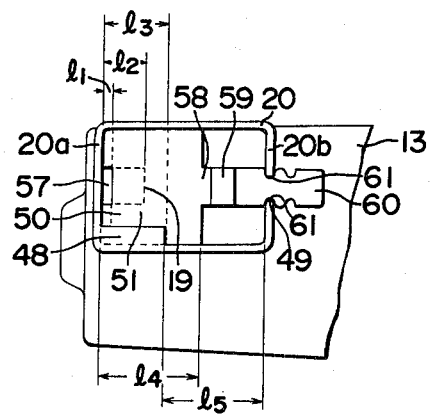
FIG. 4 is a side elevational view of a residual matter outlet opening portion in the case of the apparatus.
Figure 5:
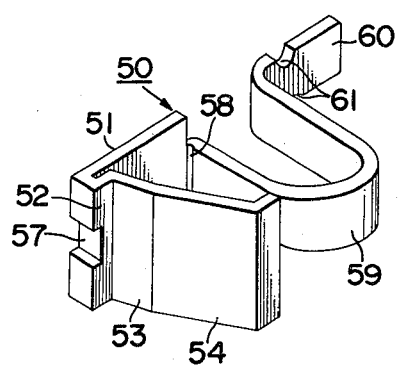
FIG. 5 is a perspective view of an open and close member of the apparatus.

Referring to FIGS. 1 and 2, a reference numeral 1 denotes a base of food processing apparatus in accordance with the invention, in which defined is a motor section 2 and a transmission section 3 above the motor section 2. A platform 5 for placing a juice container 79 and residual matter receiver is formed on a step provided at one side of the motor section 2.

A motor 7 is mounted beneath the upper surface of the motor section 2 of the base 1, through the medium of a rubber cushioning member (not shown). A gear case 8 accomodates a reduction gear type transmission mechanism (not shown) connected operatively to the motor 7 and mounted on the latter, and situated in the aforementioned transmission section 3. A drive shaft 9 projects horizontally from the gear case 8. The drive shaft 9 is provided at its one end with a coupling portion 10 which projects into a hole 12 formed in a side wall 11 of the base 1 at a portion of the latter confronting the coupling portion 10.

A reference numeral 13 denotes a squeezing case. The squeezing case 13 is a substantially cylindrical member made of a plastic and having an inside diameter or conical bore gradually decreasing from the inlet end toward a forward discharge end thereof. The case 13 has a horizontally extending axis and is attached to the base 1 at its opened base end. A material inlet cylinder 14 is formed on the upper face or side of the base end of the case 13. The inlet cylinder 14 has an upper end opening 15 through which a push rod (not shown) is retractably extended.

A juice outlet opening 17 opens in the lower face of the case 13. An arcuate planar filter 18 made of a metal plate having a multiplicity of openings 18a is detachably secured to the case 13 at the juice outlet opening 17, along the inner peripheral surface of the case 13, and is substantially flush with the latter.

A residual matter outlet opening 19 is formed at the upper rear side of the forward end portion of the case 13 so as to extend substantially in the tangential direction to the inner peripheral surface of the case. The residual matter outlet opening 19 is positioned at a portion circumferentially spaced from the juice outlet opening 17, so as to discharge the residual matter which has passed over the filter 18. A cylindrical residual matter discharge sleeve 20 is projected from an outer peripheral surface of the case 13 at the residual matter outlet opening 19.

A bearing recess 28 is formed at the center of the forward end of the case 13, so as to receive a bearing 29 made of a metal or a plastic.

A screw portion 22 is formed in the periphery of the base end opening 21 of the case 13. A lid 25 is detachably screwed to the threaded portion 22 of the opening of the squeezing case 13, so that the case 13 is closed by this lid 25 in such a manner as to be able to be opened as desired.

A shaft supporting hole 26 is formed at the center of the inner surface of the lid 25, so as to fittingly receive a bearing 27 made of a metal or a plastic.

A screw thread 30 for engaging the threaded portion 22 of the case 13 is formed on the inner surface of the lid 25.

A fitting sleeve 32 is formed concentrically on the outer end of the lid 25. A diametrically opposed retainer holes 33 are formed in the fitting sleeve 32 in order to receive therein clamp retaining pawls (not shown).

Reference numeral 36 denotes a rotary member. The rotary member 36 has a conical shape having a diameter which gradually increases toward the forward end thereof i.e., the end nearest the narrower end of the bore.

A rotary shaft 38 extends through this rotary member 36 and projects at both its ends from the rotary member 36. The projected ends of the rotary shaft 38 are rotatably carried by the aforementioned bearings 27, 29. A coupling portion 39 formed at the base end of the rotary shaft 38 projects through hole 26 of the case 13 and releasably engages the coupling portion 10 of the drive shaft 9. The center of the rotary member 36 substantially coincides with the center of the substantially conical inner surface of the case 13. A spiral cutting blade portion 40 and a spiral squeezing or pressing portion 41 are formed on the periphery of the rotary member 36. The cutting blade portion 40 is located to confront the inlet opening in inlet cylinder 14 of the case 13, so that the material to be processed is inserted into the case through the cylinder 14 and is ground and crushed by cooperation between the cutting blade portion 40 and the opening edge 42 of the case 13.

The squeezing or pressing portion 41 of the rotary member 36 has a spiral blade 45 continuous from the cutting blade portion 40, so that the material to be processed is shifted toward the forward end of the rotary member 36 as the latter rotates in one direction. The outside diameter of the valley 46 between adjacent ridges 47 of the spiral blade is gradually increased, so that the difference between the diameter of the valley 46 and the diameter of the crests 47 is gradually decreased toward the forward end of the rotary member 36. In addition, the pitch of the spiral blade 45 forming the cutting blade portion 40 and the pressing portion 41 is gradually decreased toward the forward end of the rotary member 36.

A constant small gap is preserved between the outer peripheral surfaces of the crest 47 of the cutting blade portion 40 and the pressing portion 41, and the inner peripheral surface of the case 13. A guide edge 48 is formed extending in the axial direction of the rotary member 36 on an upper portion of said residual matter discharge sleeve 20 of the case 13, facing toward the residual matter outlet opening 19. One side surface 20a of said residual matter discharge sleeve 20 coincides with a forward edge of the residual matter outlet opening 19 and the other side surface 20b is arranged on a position remote from the residual matter outlet opening 19 toward the base end of the case 13. An engaging concave portion 49 is provided on said other side surface 20b of the residual matter discharge sleeve 20.

An open and close member 50 made of a synthetic resin comprises a closing portion 51 toward be faced to said residual matter outlet opening 19 and moved in parallel to the axial direction of the rotary member 36 along said guide edge 48, a first yielding portion 53 which is connected to the closing portion 51, folded at one end 52 of said closing portion 51 and facing toward said one side surface 20a of the residual matter discharge sleeve 20, and extended obliquely inwardly from the one end 52, a second yielding portion 54 which is connected to the first yielding portion 53 and extended obliquely inwardly therefrom, and a contact portion 55 which is connected to the second yielding portion 54 and folded normally therefrom so as to be able to slidably contact with the outer peripheral surface of the case 13. A residual matter reservoir 56 having an opening larger than the residual matter outlet opening 19 is formed in the residual matter discharge sleeve 20 with said one side surface 20a of the residual matter discharge sleeve 20, said closing portion 51 of the open and close member 50, and said yielding portions 53 and 54.

A residual matter discharge opening 57 narrower than said residual matter outlet opening 19 is formed on a forward end of the closing portion 51 of the open and close member 50.

The open and close member 50 is provided at a base end side thereof with a resilient spring portion 59 in the form of U and integrally connected thereto through a thin hinge portion 58. An operating portion 60 is provided on a free end of said resilient spring portion 59. Latching portions 61 which are detachably engaged with said engaging concave portion 49 formed on the other side surface 20b of the residual matter discharge sleeve 20 are formed on the operating portion 60.

In the above mentioned construction, the open and close member 50 can be inserted into the residual matter discharge sleeve 20 by inserting the closing portion 51, the yielding portions 53 and 54, and the contact portion 55 through a clearance between the guide edge 48 and the other side surface 20b of the residual matter discharge sleeve 20 while the spring portion 59 is turned outwardly from the closing portion 31 centering around the hinge portion 58.

The dimension of the open and close member 50 is as follows.

The relation between the length $l_1$ of the discharge opening 57, the width $l_2$ of the residual matter outlet opening 19, and the width $l_3$ of the residual matter reservoir 56 is $$l_1 < l_2 < l_3.$$

The relation between the width $l_4$ of the closing portion 51 of the open and close member 50 and the length $l_5$ between the guide edge 48 and the other side surface 20b of the residual matter discharge sleeve 20 is $$l_4 < l_5.$$

A reference numeral 62 designates a clamp case body provided with a fitting sleeve 65 adapted to fit an annular frame 67 formed on an outer surface of a side wall 63 of the gear case 8 concentrically with the outer periphery of the drive shaft 9. The aforementioned coupling portion 10 of the drive shaft 9 is disposed within this fitting sleeve 65.

The clamp case body 62 is fixed to the side wall 63 of the gear case 8 by means of a screw. The clamp case body 62 is provided with a tubular portion 64 so as to fit the fitting sleeve 32 of the lid 25 while the throwing cylinder 14 of the case 13 is arranged at the upper or lower position.

The juice vessel is also mounted on the supporting bed 5 of the base 1, with its upper opening positioned beneath the juice outlet opening 17 formed in the squeezing case 13. The residual matter receiving vessel to be connected to the residual matter discharge sleeve 20 of the case is also mounted on the supporting bed 5 of the base.

The apparatus of this embodiment having the construction described heretofore is used in a manner explained hereinunder.

The open and close member 50 is fitted on the residual matter discharge sleeve 20 of the case according to the following steps: turning the spring portion 59 outwardly from the closing portion 51 of the open and close member 50 centering around the hinge portion 58, inserting the closing portion 51, the yielding portions 53 and 54, and the contact portion 55 through the clearance between the guide edge 48 and the other side surface 20b of the residual matter discharge sleeve 20, slidably engaging the closing portion 51 with the inner surface of the guide edge 48 while contacting the contact portion 55 with the outer surface of the case 13, and then inserting the spring portion 59 by turning it inwardly centering around the hinge portion 58 into the residual matter discharge sleeve 20, so that one end of the closing portion 51 is contacted with the one side surface 20a of the residual matter discharge sleeve 20, the spring portion 59 is contacted with and held by the other surface 20b, and the latching portions 61 of the operating portion 60 are engaged with the engaging concave portion 49.

When the rotary member 36 is inserted into the case 13 through the base end opening 21 of the case 13, the lid 25 is engaged with the base end opening 21, so that the rotary shaft 38 is supported by the bearings 27 and 29. The fitting sleeve 32 of the lid 25 is fitted into the clamp case body 62 mounted on the base 1 in the state that the inlet cylinder 14 of the case 13 is faced upwardly, the clamp engaging pawl (not shown) is engaged with the latching holes 33, and at the same time the coupling portion 39 of the rotary shaft 38 is connected to the coupling portion 10.

When the motor 7 is driven, the drive shaft 9 is driven at a reduced speed and the rotary shaft 38 is rotated through the coupling portions 10 and 39, so that the rotary member 36 is rotated. In this state, if the material to be processed is inserted into the case through the material inlet cylinder 14 and the pressing rod (not shown) is pressed, the material is fed to the forward end of the rotary member 36 while it is cut by the cooperation between the cutting blade portion 40 of the rotary member 36 and the open edge portion 42 of the material inlet cylinder 14. The material which has been cut into pieces is fed into the pressing portion 41 having the spiral blade 45 continuing from the spiral cutting blade portion 40. In this pressing portion 41, since the difference of the diameter between the valley 46 and crest 47 is successively decreased toward the end of the rotary member 36, the material is progressively crushed into smaller pieces so that the expelled liquid content is discharged through the juice outlet opening 17 through the small holes 18a in the filter 18. The liquid content, i.e. the juice then drops into the juice vessel 79. In the meantime, the residual matter including fibers is discharged into the residual matter discharge sleeve 20 through the residual matter outlet opening 19. It will be seen that the residual matter outlet opening 19 is positioned at one side of the squeezing case 13, at such a position as to be downstream from the juice outlet opening 17 as viewed in the direction of rotation of the rotary member 36. Therefore, the residual matter is discharged through the residual matter outlet opening 19 only after the extraction of the juice over the juice outlet opening 17. Then, the residual matter is discharged concentrically without absorbing the juice. The residual matter is discharged into the residual matter discharge sleeve 20 through the residual matter outlet opening 19, and collected in the residual matter reservoir 56, and then discharged successively from the discharge opening 57. If the pressure in the case 13 is increased, the quantity of the residual matter discharged from the residual matter outlet opening 19 is increased. When the residual matter is collected in the residual matter reservoir 56 the yielding portions 53 and 54 of the open and close member 50 are urged thereby, so that the closing portion 51 is moved along the guide edge 48 while the spring portion 59 is compressed by the closing portion 51, a clearance is formed between the forward end of the closing member 51 and the side surface 20a of the residual matter discharge sleeve 20, and the quantity of the residual matter to be discharged is increased, thereby reducing the abnormal pressure in the case 13.

When the pressure in the case 13 is reduced, the quantity of the residual matter to be discharged from the residual matter outlet opening 19, and the pressure in the reservoir 56 are reduced, so that the closing portion 51 is returned in the closing position by the spring action of the spring portion 59.

After the material to be processed has been processed as described above, the fitting sleeve 32 of the lid 25 is removed from the tubular portion 64 of the clamp case 62 by releasing the clamp pawl from the latching holes 33, the rotary member 36 is removed from the case 13 by detaching the lid 25 from the case 13, and the filter 18 is removed for washing.

The open and close member 50 can be taken out of the residual matter discharge sleeve 20 by the steps of removing the latching portions 61 of the operating portion 60 from the engaging concave portion 49, and turning outward the spring portion 59 of the residual matter discharge sleeve 20 centering around the hinge portion 58.

In the case when the cooking apparatus is not being used, the lid 25 is mounted on the clamp case body 62 in such a manner that the inlet cylinder 14 is arranged at a lower position, so that as shown in FIG. 2 the cylinder 14 does not project upwards and the overall height of the apparatus is reduced, thereby causing the encasing of the apparatus for storage to be easy.

The open and close member 50 can also be taken out of the residual matter discharge sleeve 20 through the clearance opening between the end of the guide edge 48 and the side surface 20b by compressing the spring portion 59. Further, in the above described embodiment, the resilient spring portion 59 for biasing the open and close member 50 is provided as integral with the open and close member 50. However, it will be appreciated that a coiled resilient member which is not integral with the open and close member 50 can be used instead of the resilient spring portion 59.

Figure 6:
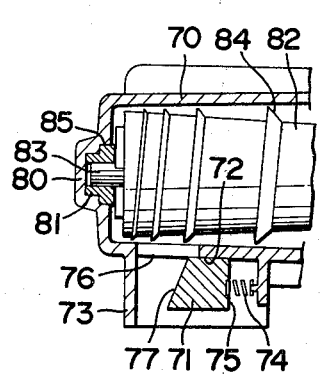
FIG. 6 is a cross-sectional view of the residual matter discharge portion of another embodiment of the invention.
Figure 7:
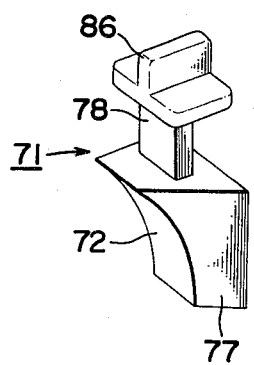
FIG. 7 is a perspective view of the open and close member of the other embodiment of the invention.

As shown in FIGS. 6 and 7, in the other embodiment of the present invention, an adjusting open and close member 71 comprises a curved sliding surface 72 contacting with an outer peripheral surface of a squeezing case 70, a press surface 75 which is urged forwardly by a resilient coil spring 74 supported in a residual matter discharge sleeve 73, an oblique surface 77 facing to a residual matter outlet opening 76 of the case 70 so as to reduce gradually the opening of the residual matter discharge sleeve 73 going toward the outward direction, and a nob 86 having a leg 78 provided at a side surface thereof. The leg 78 of the nob 86 is slidably engaged with a guide groove (not shown) provided on an upper surface of the residual matter discharge sleeve 73 and opened at one end thereof at a rear end of the residual matter discharge sleeve 73.

A bearing 81 made of metal or synthetic resin is fitted with a bearing concave portion 80 formed at an end portion of said case 70. A rotary shaft 83 of a rotary member 82 is rotatably supported by said bearing 81. A spiral cutting blade 84 is formed on an outer peripheral surface of the rotary member 82 as in the first embodiment. Further, a residual matter discharging blade 85 is provided an end surface of the rotary member 82.

The residual matter after the juice has been squeezed is fed to the forward end of the rotary member 82 and discharged through the residual matter outlet opening 76 from the residual matter discharge sleeve 73.

Because the residual matter outlet opening 76 is normally closed by the adjusting open and close member 71 urged by the spring 74, in case that the pressure of the residual matter fed by the spiral cutting member 84 is smaller than the pressing force of the spring 74 the residual matter outlet opening 76 is not opened, so that the squeezing time is extended and squeezing force is increased thereby causing the material to be squeezed fully.

If the force for pressing the oblique surface 77 of the adjusting open and close member 71 becomes larger than the pressing force of the spring 74 because some quantity of residual matter is collected in the residual matter outlet opening 76, the adjusting open and close member is retracted according to the pressure of the residual matter to be discharged from the residual matter outlet opening, so that the residual matter outlet opening 76 is opened and the residual matter is discharged from the residual matter discharge sleeve 73.

According to the discharge of the residual matter, the adjacent open and close member 71 is urged by the spring 74 and serves to close the residual matter outlet opening 76.

What is claimed is:

1. An apparatus for separating liquid and residual matter from a material comprising a case having upper, lower and lateral sides and opposite end walls and having a bore with an inner peripheral surface, said case being provided on the upper side with a material inlet opening communicating with said bore, with a juice outlet opening on the lower side having a filter and communicating with said bore, and with a residual matter outlet opening formed on one lateral side and communicating with said bore, a rotary member rotatably mounted in said bore and having a spiral cutting blade portion for cutting material to be processed which is inserted into the bore through the material inlet opening and a pressing portion continuing from said cutting blade portion for pressing the material to be processed, said rotary member feeding said material to be processed toward an end of the bore while cutting and pressing the material to be processed, an adjusting open and close member which is arranged on the outside of the bore adjacent the residual matter outlet opening and movable between one position wherein it effects substantial closure of said residual matter outlet opening and another position wherein it effects opening of said residual matter outlet opening, said member defining an exit opening smaller in area than said residual matter outlet opening through which residual matter can flow when said member is in its one position, and biasing means operatively connected to said member to bias said member toward said one position, said member being urged by pressure of residual matter discharged from said residual matter outlet opening to effect opening of the residual matter outlet opening.

2. Apparatus according to claim 1 including a residual matter discharge sleeve on the outer surface of the case at the residual matter outlet opening and wherein said adjusting open and close member is mounted, said member cooperating with said sleeve to define a residual matter reservoir having an inlet opening which is larger than the residual matter outlet opening and communicating therewith, said reservoir having an outlet opening which is defined by said exit opening of said member.

3. Apparatus according to claim 2 wherein said adjusting open and close member comprises a movable closing portion confronting but spaced from said residual matter outlet opening, said closing portion cooperating with said sleeve to define said exit opening, and wherein said member further comprises a yielding portion connected to said closing portion and defining a side of said reservoir, said closing portion being movable in response to said biasing means and to the pressure of said residual matter.

4. Apparatus as claimed in claim 3 wherein a guide edge for slidably holding said closing portion of the adjusting open and close member is provided in said residual matter discharge sleeve.

5. Apparatus as claimed in claim 4 wherein the length of said guide edge is so determined that a clearance is provided for allowing said adjusting open and close member to be inserted into and removed from said residual matter discharge sleeve.

6. Apparatus as claimed in claim 3 or 4 or 5 wherein said adjusting open and close member comprises a spring portion which is connected to said closing portion through a hinge, and an operating portion which is connected to said spring portion, said operating portion having a latching portion engageable with an engaging portion formed on said residual matter discharge sleeve, said spring portion, closing portion, hinge and operating portion being integrally formed with one another.

7. Apparatus as claimed in claim 2 or 4 or 5 or 3 wherein said biasing means comprises a spring disposed between said adjusting open and close member and said sleeve.

* * * * *